US011777810B2

(12) United States Patent
Le Mouel

(10) Patent No.: US 11,777,810 B2
(45) Date of Patent: Oct. 3, 2023

(54) STATUS SHARING IN A RESILIENCE FRAMEWORK

(71) Applicant: Oracle International Corporation, Redwood Shores, CA (US)

(72) Inventor: Philippe Le Mouel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/682,321

(22) Filed: Feb. 28, 2022

(65) Prior Publication Data

US 2022/0182290 A1    Jun. 9, 2022

Related U.S. Application Data

(63) Continuation of application No. 16/027,100, filed on Jul. 3, 2018, now Pat. No. 11,290,341.

(51) Int. Cl.
*H04L 41/14* (2022.01)
*H04L 41/0654* (2022.01)

(52) U.S. Cl.
CPC .......... *H04L 41/14* (2013.01); *H04L 41/0654* (2013.01)

(58) Field of Classification Search
CPC . H04L 41/14; H04L 41/0654; H04L 43/0876; H04L 43/08; H04L 43/16
See application file for complete search history.

(56) References Cited

U.S. PATENT DOCUMENTS 6,754,664 B1    6/2004  Bush
9,503,341 B2   11/2016  Repperger
(Continued)

FOREIGN PATENT DOCUMENTS

CA    2998436 A1 * 10/2018 ......... H04L 41/0631

OTHER PUBLICATIONS

Youakim Badr, Salim Hariri , Youssif AL-Nashif, Erik Blasch; "Resilient and Trustworthy Dynamic Data-driven Application Systems (DDDAS) Services for Crisis Management Environments" https://www.sciencedirect.com/science/article/pii/S1877050915011783; Procedia Computer Science vol. 51, 2015, pp. 2623-2637 8 pages.

(Continued)

*Primary Examiner* — Kevin T Bates
*Assistant Examiner* — Ranjan Pant
(74) *Attorney, Agent, or Firm* — Trellis IP Law Group, PC

(57) ABSTRACT

An example framework and method facilitate enhancing resiliency of a computing environment. The example method includes dynamically discovering or accessing first status information related to a first metric associated with a first resource of the computing environment; selectively sharing the first status information among one or more computing environment resources, including the first resource, resulting in shared status information; and using the shared status information to selectively initiate one or more responses by the one or more resources in accordance with the shared status information. In a specific implementation, metrics managers may manage metrics and initiate remediation actions when certain criteria are met; the resources can selectively quiesce or unquiesce when the certain criteria are met or when their status changes accordingly; and a resiliency manager may coordinate communications between metrics managers and computing resources. Use of MBeans may facilitate pluggability of resources into the resiliency framework of the computing environment.

18 Claims, 6 Drawing Sheets

(56) References Cited

U.S. PATENT DOCUMENTS

| | | | |
|---|---|---|---|
| 9,563,777 B2 | 2/2017 | Deng et al. | |
| 9,692,654 B2 | 6/2017 | Rosier | |
| 2005/0273668 A1* | 12/2005 | Manning | H04L 12/66 |
| | | | 714/39 |
| 2009/0171707 A1* | 7/2009 | Bobak | G06Q 10/06 |
| | | | 705/7.23 |
| 2011/0010518 A1* | 1/2011 | Kavuri | G06F 9/50 |
| | | | 711/170 |
| 2011/0019531 A1 | 1/2011 | Kim et al. | |
| 2013/0185667 A1* | 7/2013 | Harper | G06F 11/0709 |
| | | | 715/772 |
| 2016/0057034 A1* | 2/2016 | Rosier | H04L 41/0631 |
| | | | 709/224 |
| 2016/0094431 A1* | 3/2016 | Hall | H04L 41/22 |
| | | | 709/224 |

OTHER PUBLICATIONS

"Four-Part Framework for Resilient Data Center Architecture" http://bruns-pak.com/four-part-framework-resilient-data-center-architecture/ Mar. 18, 2014 3 pages.

"Resource reliability using fault tolerance in cloud computing" https://ieeexplore.ieee.org/document/7877391/Next Generation Computing Technologies (NGCT), 2016 2nd International Conference on Oct. 14-16, 2016 Date Added to IEEE Xplore: Mar. 16, 2017 1 page.

\* cited by examiner

STATUS SHARING IN A RESILIENCE FRAMEWORK

CROSS REFERENCES TO RELATED APPLICATIONS

This application is a continuation of the following application, U.S. patent application Ser. No. 16/027,100, entitled DYNAMIC RESILIENCY FRAMEWORK, filed on Jul. 3, 2018, which is hereby incorporated by reference as if set forth in full in this application for all purposes.

This application is related to the following patent, U.S. Patent Application No. 10,931,508, entitled SCALABLE DYNAMIC JMX FEDERATION, issued on Feb. 23, 2021, which is hereby incorporated by reference as if set forth in full in this application for all purposes.

BACKGROUND

The present application relates to computing, and more specifically to software and accompanying methods for facilitating resiliency and efficiency of networked computing environments.

Systems and methods for enhancing resiliency of computing environments are employed in various demanding applications, including balancing of workloads among servers and server clusters of cloud-based computing environments; orchestrating and coordinating delivery of messages in large integrated networks, including social media platforms, enterprise networks, crypto currency networks, Internet Of Things (IOT) networks, and so on.

Such computing environments may include complex heterogeneous systems that dynamically grow as disparate development teams add new functionality and computing resources to the associated computing environments. Such systems often demand resilient services and mechanisms for ensuring that problematic services and associated computing resources do not degrade overall network performance and slow the associated server cluster(s). Such applications may further demand efficient orchestration mechanisms for adjusting processes and routing and servicing requests in accordance with feedback from resource monitoring tools.

Generally, cloud-based networked computing environments may include large server clusters running concurrent processes that may access computing resources from various servers and/or other computing resources of a given server cluster. The applications or processes (which may include administrator UI consoles, etc.) in the computing environment may require knowledge as to available resources, health status of the resources, whether or not errors have been thrown, current computing loads on individual resources, server configuration, server state (status) change information, available memory, thread count, etc. Sensing such conditions is called instrumentation.

Conventionally, to implement computing resource instrumentation and associated network resiliency functionality on a given server cluster, special software libraries and/or associated Application Programming Interfaces (APIs) are used to wrap computing resources, i.e., to interface the computing resources with software designed to monitor and implement functions to mitigate problematic network conditions, adjust message routing and system orchestration, and so on. Instrumentation of such complex heterogeneous computing environments and associated server clusters can be particularly problematic, e.g., expensive, time-consuming, and costly, especially when all participating network resources must incorporate complex specialized software libraries.

When adding new components to such a computing environment, developers use the APIs and accompanying complex granular libraries to interface their components with the computing environment. This often necessitates tight coupling between network computing resources and associated modules, such that a change in a particular resource may force corresponding changes in other system components. Accordingly, implementations of services and other components may require additional time and effort to account for excessive dependencies between modules, which can further complicate component reuse and testing.

As such, use of the complex APIs and accompanying libraries to wrap network resources can be problematically time consuming, expensive, and may require inordinate technical expertise. Reliance upon such APIs can be particularly problematic when multiple disparate entities, which may employ different types of hardware and software, wish to provide computing resources to the computing environment. Furthermore, use of such fine-grained libraries to wrap computing resources in a cloud-based computing environment may inhibit rapid scalability and may require outside developers to rewrite their code.

In addition, such conventional mechanisms for enhancing network resiliency may require use of a centralized administration server. With such conventional approaches, if the administration server becomes inoperable, overall network resiliency can be excessively compromised. Accordingly, such a centralized administration server may represent a problematic single point of failure, thereby potentially further compromising overall network resiliency.

SUMMARY

An example method facilitates enhancing resiliency of a computing environment, in part by using an adaptable and scalable framework for enabling the sharing of status or state information (e.g., health status, metrics, etc.) among components, i.e., computing resources, where the state information may be derived from metrics critical to the operation of certain computing resources. The state information (e.g., quiesced state, unquiesced state, warning state, etc.) is also usable to selectively trigger remediation actions that attempt to "heal" resources; to trigger the quiescing and unquiescing of computing resources; to trigger the issuance of warnings when a resource enters a warning status; to enable a load balancer to selectively route messages in a server cluster, and so on.

The example method includes using a first mechanism to monitor one or more metrics of a computing environment and to set status information of the first mechanism in response thereto; selectively implementing one or more remediation actions in accordance with the status information; making the status information automatically discoverable by a second mechanism; using the second mechanism to make the status information available to resources of the computing environment; and selectively implementing a quiescing or unquiescing of one or more of the resources in accordance with the status information.

In a more specific embodiment, the first mechanism includes one or more Metrics Managers (MMs) associated with one or more computing resources. The one or more MMs may be implemented as Managed Beans (MBeans).

The second mechanism includes a Resiliency Manager (RM), which may be implemented as another MBean that incorporates functionality for making the status information automatically discoverable. Making the status information automatically discoverable may include registering MBeans pertaining to the one or more MMs at an MBean server accessible to the RM; using the RM to respond to a timer thread to automatically discover the one or more MMs using the MBean server, resulting in one or more discovered MMs; and employing the RM to selectively obtain status information for each of the one or more discovered MMs.

In addition, the RM selectively provides status information to the one or more discovered resources (e.g., via a push and/or pull operation using one or more MBeans used to represent or expose the one or more resources). Accordingly, providing of the status information may include using one or more MBeans of the one or more resources to communicate with the RM, thereby facilitating enabling the one or more resources to obtain the status information determined in accordance with the one or more applicable metrics of the computing environment, wherein the one or more applicable metrics are applicable to operation of the one or more respective computing resources.

The status information may indicate, for example, one or more of the following statuses or states for a resource of the one or more resources: a quiesced status, an unquiesced status, a warning status. The specific example method further includes employing the one or more MMs to cause initiation of a remediation action in response to one or more metrics monitored by the one or more MMs passing a predetermined threshold value for the one or more metrics; the predetermined threshold of which corresponds to a threshold past which status information of the one or more metrics managers changes.

The one or more metrics may include one or more descriptors of a property or condition of a computing resource that is associated with an MM of the one or more MMs, and whose functioning is critical to an operation of the computing resource. The one or more MMs associated with the computing resource are associated therewith by name in accordance with a predetermined naming convention.

Hence, the example framework and accompanying methods implemented thereby facilitate dynamic or automatic discovery of and orchestration of computing resources and implementation of responses (e.g., quiescing, unquiescing, implementation of remediation actions, and so on) based on associated resource status information and related or associated metrics or measurements of specific critical parameters affecting robust resource performance and thereby overall computing environment performance.

The associated framework is usable, for example, by an accompanying health-check resource (e.g., a load balancer health-check module) to readily determine whether a given computing resource or collection of computing resources (representing a larger resource), e.g., as may be running on a Virtual Machine (VM) that implements a server, is/are healthy (e.g., unquiesced) based on periodically automatically or dynamically discovered metrics and resource status information. The ability to take remediation actions responsive to metrics and associated resource status information can further greatly facilitate overall system resiliency (e.g., fault tolerance, resource utilization efficiency, ability to adapt to changing network conditions and resource states, and so on).

Computing resources that are dynamically discovered can be issued signals to quiesce or unquiesce. In a server cluster, the runtimes of servers can be selectively quiesced and/or unquiesced based on health status (e.g., as may be determined by an accompanying health-check resource). To quiesce such a runtime, resources that are part of the runtime may quiesce in response to detection of predetermined network conditions (as may be indicated via resource status information obtained from the RM) indicating that quiescing the runtime is appropriate.

Furthermore, use of MBeans to facilitate communications between modules of the framework facilitates enabling automatic adjustments when new resources are added to or removed from the computing environment. In addition, developer teams that may be adding computing resources to the computing environment can readily plug them into the computing environment without the need to rewrite their code. For example, such a team may simply add and expose (e.g., register with an MBean server in communication with the RM) resource MBeans and MM MBeans, where the simple MBeans implement simple methods (e.g., push/pull methods) for communicating with the RM.

Hence, the example framework need not use complex tightly-coupled problematic code libraries to address computing environment resiliency, i.e., to allow the computing environment to function efficiently even if certain components or resources are no longer operating optimally. Developer teams can now participate in the overall resiliency framework with minimal effort.

In summary, resources of the framework can readily determine, as needed, whether a VM/Server or other resource or sub-resource is healthy based on dynamically discovered resources (that may be exposed via MBeans) and associated metrics and status information. Components of the framework may readily take remediation actions (e.g., to heal resources), and may enable communication (e.g., via a RM) between resources that are dynamically discovered, and may issue quiesce/unquiesce signals to the resources, which may then selectively quiesce/unquiesce in response. In a cluster, the framework readily enables healthy servers to process requests, while unhealthy servers may quiesce until healthy again.

Various benefits that flow from various embodiments discussed herein include, but are not limited to: enabling addition of resiliency to a computing environment with minimal effort; enabling easy incorporation of the framework into virtually any type of server cluster architecture, resources, and so on, where the resources may be monitored or managed via MBeans or similar computing objects; enabling developers to readily add resources to the system without requiring implementation of complex tightly-coupled interfaces and without requiring re-writing existing code; enabling selective routing of messages (e.g., via a load balancer and/or orchestrator) for handling by computing resources that are suitably healthy (e.g., not overloaded, running low on memory, exhibiting problematic errors, etc.) to handle the requests; enabling addition of computing resources to the computing environment, as part of a running system in the computing environment; and so on.

A further understanding of the nature and the advantages of particular embodiments disclosed herein may be realized by reference of the remaining portions of the specification and the attached drawings.

DETAILED DESCRIPTION OF EMBODIMENTS

Figure 1:
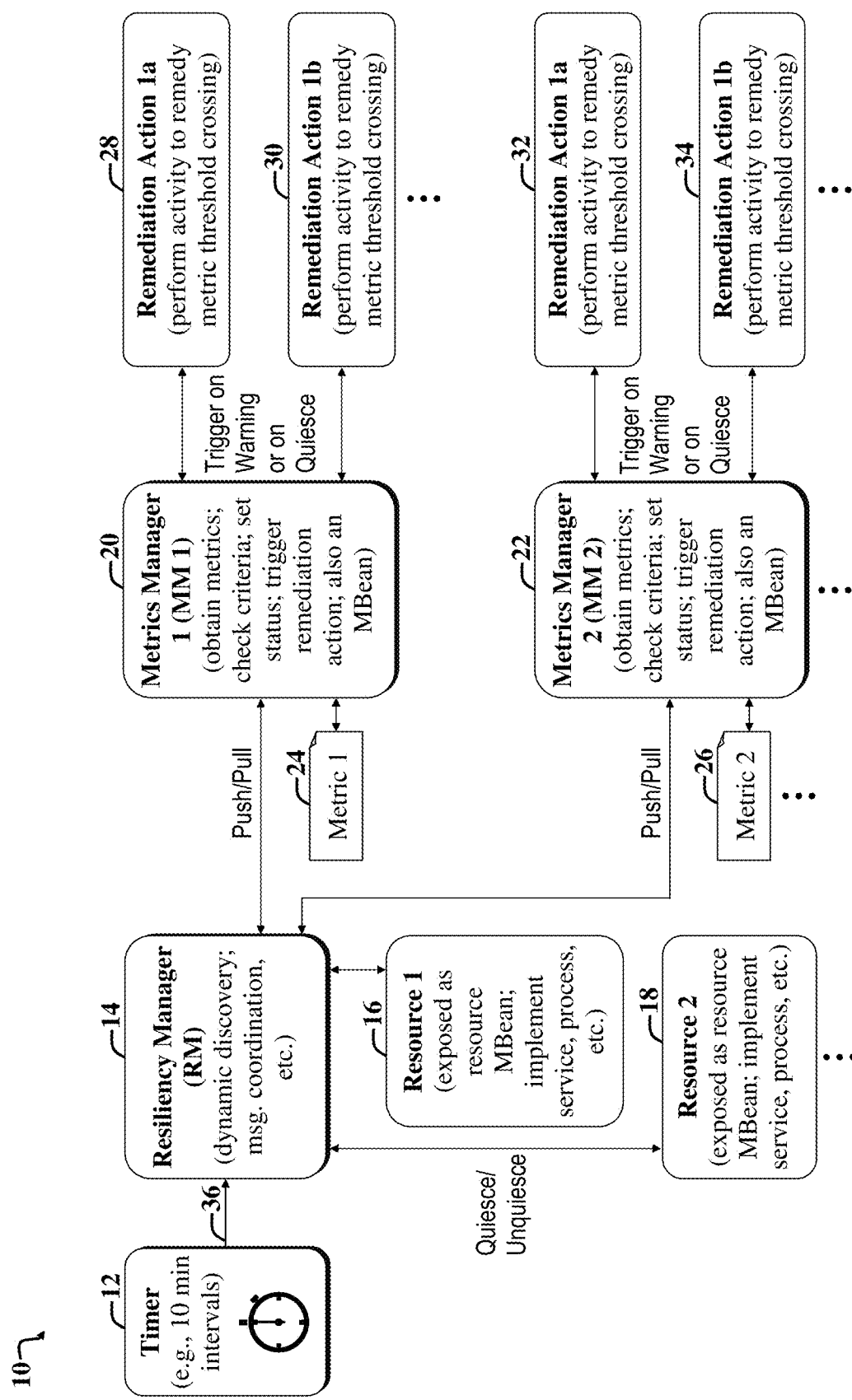
FIG. 1 is a first block diagram illustrating a first example system and accompanying computing environment that includes a resiliency framework to facilitate efficient and robust operation of the accompanying computing environment.

For the purposes of the present discussion, a computing environment may be any collection of computing resources used to perform one or more tasks involving computer processing. A computer may be any processor in communication with a memory. Generally, computing resource may be any component, mechanism, or capability or quantities thereof of a computing environment, including, but not limited to, processors, memories, software applications, user input devices, and output devices, servers, processes, and so on.

Specifically, the resources discussed used herein are computing resources that can be quiesced or unquiesced, e.g., a process, software application, database connection, runtime, message handler, load balancer, mount point on a file system, and so on. A resource is said to be quiesced if it is taken offline, disconnected from the computing environment, or otherwise paused or altered, such as in preparation for certain remediation actions, backups, maintenance, and so on. Similarly, an unquiesced system is online, i.e., operating within the computing environment.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For the purposes of the present discussion, a resiliency framework may be any mechanism or collection of mechanisms, which may include computing rules, guidelines, formats, and so on, for supporting, facilitating, or otherwise fostering resiliency of a computing environment. The computing rules and guidelines may be incorporated as adaptable reusable code that provides support for different implementations of software systems incorporating the framework. Embodiments of the resiliency framework discussed herein may be extensible, nestable, and generally adaptable to various types of computing environments and accompanying server clusters, clouds (e.g., supporting cloud services), and so on. The terms "resiliency architecture" and "resiliency framework" may be employed interchangeably herein.

The resiliency of a computing environment may refer to computing environment reliability, e.g., an ability to be resistant to faults, data and processing overloads, computing inefficiencies, and so on. Accordingly, a relatively resilient computing environment may be relatively reliable, fault tolerant, and have an ability to adapt to problems (e.g., software errors, misconfigurations, malware attacks, and so on) with individual computing resources and/or collections thereof. Relatively resilient computing environments may be relatively capable of maintaining computing efficiency (e.g., resource-utilization efficiency) in the face of challenges, e.g., network overloads, data server failures, and so on.

For clarity, certain well-known components, such as hard drives, processors, operating systems, power supplies, Internet Service Providers (ISPs), class loaders, bytecode compliers, job trackers, task trackers, Managed Bean (MBean) servers, MBean Server connectors, protocol adapters, Java Virtual Machine (JVM) garbage collectors, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment that implements a resiliency framework to facilitate efficient and robust operation of the accompanying computing environment. In the present example embodiment, the system 10 is run within a VM (e.g., a Java Virtual Machine) that implements a managed server, which may be part of server cluster or larger computing environment, as discussed more fully below.

In general, a server running on or represented by a VM is said to be virtualized. For the purposes of the present discussion, a virtualized computing process or application may be a process or application that is associated with a layer of abstraction, called a VM, that decouples, at least in part, physical hardware from the process or application. A VM may have so-called virtual hardware, such as virtual Random Access Memory (RAM), Network Interface Cards (NICs), and so on, upon which virtualized applications, such as operating systems and servers, are loaded. The virtualized computing processes may employ a consistent virtual hardware set that can be substantially independent of actual physical hardware.

For the purposes of the present discussion, a managed server may be any server that is part of a server cluster that is managed by one or more management entities, e.g., an administrator server. Servers that are managed by a given administration authority are said to be part of a server domain or computing domain governed by the administration authority. An example of a computing domain is a WebLogic Server (WLS) domain governed by a WLS administrator server, which may administrate node managers, which may in turn administrate WLS managed servers within each node, wherein each node may include plural managed servers running on a particular machine. The computing domain may represent a particular server cluster. Each server of the server cluster, i.e., each managed server, may be implemented via one or more Java Virtual Machines (JVMs), also simply called VMs herein.

The example system 10 includes a Resiliency Manager (RM) 14 that is periodically (e.g., at 10 minute intervals) or otherwise strategically activated in response to a timer thread 36 from a timer 12. The RM 14 communicates with one or more Metrics Managers (MMs) 20-22 (e.g., a first MM 20 and a second MM 22) and one or more exposed resources 16, 18 (e.g., a first resource 16 and a second resource 18). The RM 14 includes code for coordinating communications between the MMs 20-22 and the exposed resources 16-18.

In the present example embodiment, the resources 16, 18 are exposed resources, i.e., exposed to the RM 14 and any associated MBean server, as discussed more fully below. Similarly, the MMs 20, 22 are also exposed to the RM 14.

For the purposes of the present discussion, a resource is said to be exposed to the RM 14 if it is made available for discovery by the RM 14 and interaction with the RM 14. Specific implementations of the example system 10 may use Java Managed Beans (MBeans), which may be exposed to the RM 14 via registration with an MBean server that communicates with the RM 14, thereby enabling the RM 14 to automatically discover the resources, via the MBean server, which have been registered with the MBeans server as corresponding MBeans, as discussed more fully below with reference to FIG. 2.

For the purposes of the present discussion, a JavaBean may be a type of computing object; specifically, a class that may encapsulate plural computing objects into the overall computing object, i.e., the JavaBean. An MBean may be a type of JavaBean that represents a resource running in a VM, and which can incorporate functionality for monitoring and/or sensing information characterizing the resource and/or otherwise facilitate management of the represented or interfaced computing resource and facilitate instrumentation of the resource. An MBean may include a specification of attributes or data that it collects; operations, e.g., methods that it implements or supports; messages or notifications that it sends, and so on.

Certain MBeans may facilitate collecting metrics (e.g., descriptive values) pertaining to computing environment characteristics, such as performance; resource input versus throughput or bandwidth; faults; state changes; and so on. MBeans may be equipped with methods for getting (e.g., pulling) and setting (e.g., pushing) resource configurations, properties, responding to faults (e.g., quiescing), and so on. Generally, in certain implementations, all of the various modules 12-34 of the system 10 may be implemented and exposed using MBeans.

In the present example embodiment, the first MM 20 includes code, which may be implemented via an MBean, for obtaining a metric (e.g., a first metric 24) pertaining to or otherwise applicable to the operation of one or more resources; for comparing the metric to one or more criteria, e.g., thresholds; and then determining a status or state for the resource that is associated with the metric and accompanying MM 20.

For the purposes of the present discussion, a metric may be any measured or sensed value descriptive of a quality, property, of something (i.e., anything in a computing environment that can be monitored), e.g., a resource, in a computing environment. For example, one metric may be a measurement of disk space used by a particular database resource. Another example metric includes a throughput measurement of a communications link, e.g., measuring the input data rate as a function of the data-rate capacity of the link.

A metrics manager may be any code, object, or other mechanism in a computing environment that is adapted to use a metric to set state or status information (e.g., to set a quiesced status, an unquiesced status, a warning status, etc.) for a computing resource or a thing being measured by the metric, and to generate a signal to initiate a remediation action (or otherwise cause implementation of the remediation action).

A remediation action may be any software action for implementing an adjustment to an entity in the computing environment, e.g., resource, to mitigate or eliminate a condition, challenge, or problem. For example, if a database resource is filling up (with data) to capacity (which represents an adverse condition), an associated remediation action may be running a purge operation on the database, e.g., to free up space used by the database. Note that, depending upon the context in which the term is used, a remediation action may also refer to the software component, module, or functionality used to implement the remediation action.

Generally, a software action may be any process or collection of processes or operations implemented via software. Additional examples of processes include updating or editing data in a database, triggering a sequence of processes, implementing a database backup operation, and so on.

Software functionality may be any function, capability, or feature, e.g., stored or arranged data, that is provided via computer code, i.e., software. Generally, software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

The first example MM 20 communicates with modules 28, 30 that implement remediation actions 28, 30 in response to signaling from the MM 20, as discussed more fully below. Similarly, the second MM 22 also obtains a second metric 26 and can facilitate triggering associated remediation actions 32, 34 based on analysis of the metric 26, as discussed more fully below.

Note that in certain embodiments, communications between the MMs 20, 22 and the associated remediation actions 28, 30-32, 34 need not be direct, but can be routed through the RM 14 and/or other module(s).

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, in certain implementations, one or more remediation actions 28-24 may include code that is run on or by a resource 16, 18 or MBean exposed thereby.

Note that the MMs 20, 22 need not be explicitly associated with a given resource 16, 18. The RM 14 may notify any discovered resources 16, 18 of changes associated with any MM 20, 22 that may be of interest to the resources 16, 18. Each resource 16, 18 then decides which which MM status to act upon or ignore. In an alternative embodiment, each MM 20, 22 may be associated with a resource 16, 18 by name, using a naming convention (but may also, or alternatively, be associated by type, property, and/or other metadata; or otherwise not necessarily associated other than via the common RM 14). For example, a given MM 20, 22 may share a similar name or a portion of the name of the associated resource 16, 18. Exact details of the naming convention are implementation specific and may be varied to meet the needs of a given implementation, without departing from the scope of the present teachings.

Note that a given resource 16, 18 may be associated with plural metrics and plural MMs. A given resource, e.g., a database, may have many parameters or metrics that are critical to operation of the resource, e.g., allocated memory (also called allocated space), database input versus throughput, and so on. Furthermore, a given MM 20, 22 may have access to (e.g., via the RM 14) other metrics and other states of other MMs in the computing environment, as discussed more fully below. Furthermore, a given resource 16, 18 may obtain state information (via the RM) of MMs that are not necessarily associated with the resource by name, without departing from the scope of the present teachings. For example, a given database resource may obtain quiescing state information from a runtime resource, e.g., thereby informing the database that the runtime is quiescing. As another example, a VM health-check resource may provide information from associated MMs to a given resource 16, 18, thereby informing the given resource 16, 18 of the overall health state of the VM on which the system 10 is implemented.

In certain implementations, a metric 24, 26 is pushed from its associated resource 16, 18 to the RM 14, which in turn pushes the metric 24, 26 to the associated MM 20, 22. In this case, the MM 20, 22 is said to be seeded with the metric 24, 26. The RM 14 may keep a copy (e.g., in local storage) of the current metrics 24, 26. Note that in other embodiments, metrics 24, 26 can be pushed directly to the associated MMs 20, 22, and the RM 14 can pull the metrics 24, 26 from the MMs 20, 22 for local storage. Alternatively, or in addition, the MMs 20, 22 can push the metrics to the RM 14. Similarly, the MMs 20, 22 may pull metrics from the RM 14. Exact details of methods (e.g., push and pull) used to share information among modules of the system 10 can be implementation specific and may vary, without departing from the scope of the present teachings. Note that while the metrics 24, 26 can be pushed and/or pulled, the metrics 24, 26 need not be directly associated with the resources 16, 18. For example, the resources 16, 18 may be resources that are exposed for external consumption, e.g., by other services, applications, and so on. For instance, the resources 16, 18 may be servers of a server cluster, acting as REpresentational State Transfer (REST) endpoints that can be called by clients. The MMs 20, 22 may monitor specific internal resources that are used by the system 10 to function, e.g., the amount of disk space available on a given disk partition; the availability of a DataBase (DB) connection, and so on. The RM 14 discovers and pushes the status associated with the MMs 20, 22 to the exposed resources 16, 18. Those resources 16, 18 then decide what action to take. For instance, if a DB connection becomes unavailable, or the disk space for a given server is almost full, then the REST endpoints for that server 16, 18 can be quiesced, thereby preventing requests from being routed to that particular server.

In the present example embodiment, each MM 20, 22 runs code to analyze the corresponding metric 24, 26 with reference to one or more criteria, to thereby choose and set state information for the MM 20, 22. For example, the first MM 20 may compare the metric 24 to one or more predetermined thresholds, e.g., a threshold for a warning state, a threshold for a quiescing state (also called quiesce state or a quiesced state), and a threshold for an unquiescing state (also called unquiesce state or unquiesced state). The terms "state" and "status" are employed interchangeably herein.

While in the present example embodiment, the MMs 20, 22 and resources 16, 18 can be characterized (or labeled) with one of three states (i.e., quiesced, unquiesced, and warning), note that more or fewer states may be employed, without departing from the scope of the present teachings. For example, some implementations need not incorporate a warning state, while other implementations may use various different types of warning states or other intermediate states between an unquiesced state and a quiesced state.

In the present example embodiment, each MM 20, 22 monitors one metric 24, 26, where the metric 24, 26 represents a parameter or value that is critical to the operation of the associated resource 16, 18. When one of the MMs 20, 22 that monitor a given resource 16, 18 enters, for example, a quiesced state, the quiesced state is propagated to the associated resource 16, 18 via the RM 14, and may also be propagated to other MMs 20, 22. Generally, when an MM 20, 22 enters a certain status, e.g., in response to the associated metric 24, 26 crossing a predetermined threshold, the resulting status is pushed by the MM 20, 22 to the RM 14, which can then in turn push that status to the resources 16, 18 and other MMs. The RM 14 may push the status information to all dynamically discovered resources 16, 18 to allow for minimal (loose) coupling; such that new metrics and resources can readily be added to the system 10 and may work together with minimal or no coupling. Alternatively, or in addition, a resource 16, 18 can pull status information from the RM 14, and the RM 14 can query the MMs 20, 22 and pull status information therefrom. In either case, the modules 14-34 of the system 10 remain not tightly coupled.

In the present example embodiment, status information determined by each MM 20, 22 and metrics are pushed to all other MMs and resources 16, 18 (i.e., are shared among MMs and resources), which then individually determine which received information is of interest. However, embodiments are not limited thereto. For example, in alternative embodiments, the RM 14 may selectively push only metrics information and status information obtained from the MMs 20, 22 to the resources 16, 18 that have registered with the RM 14 and have specified which MMs and/or metrics that the given resources 16, 18 wish to receive by push. Furthermore, a resource 16, 18 can provide a filter based on the name and/or properties of the MM 20, 22. Furthermore, in certain implementations, the resources 16, 18 may query and pull status information and/or metrics (that the resources 16, 18 intend to use) from the RM 14.

Note that, due to the critical nature of a given metric (i.e., critical to the status and operation of a resource), when the associated MM 20, 22 enters a quiesce status, for example, this status may result in the entire resource 16, 18 entering the quiesced status, even if the resource 16, 18 has multiple (e.g., ten or fifteen) MMs monitoring different metrics associated with the given resource 16, 18. When the resource 16, 18, receives the quiesced status for an associated MM 20, 22 from the RM 14, the resource then interprets or decides what it means to quiesce, and may then quiesce in response to the status information.

Note that while in the present example embodiment, each MM 20, 22 monitors only one critical metric 24, 26, embodiments are not limited thereto. For example, in other implementations, non-critical metrics may also be monitored and processed by an MM 20, 22. For example, code running on the MMs 20, 22 may process a group of non-critical metrics as though the group of non-critical metrics were a single overall critical metric.

In the present example embodiment, the RM 20 pushes status information (e.g., quiesced, unquiesced, warning, etc.) from the MMs 20, 22 to the resources 16, 18. The resource 16, 18 then determines how to adjust e.g., by issuing a warning to users of the resource in response to a warning status; taking the resource offline in response to a quiesce status; bringing the resource online in response to an unquiesced status, and so on. For example, a given resource 16, 18 may receive a "quiesced status" (representing status information) from an associated MM 20, 22 (via the RM 14) and may or may not decide to actually quiesce in response to receipt of the "quiesced status" information. The resource itself 16, 18 may include code to individually weight the importance the status information received by a given MM 20, 22; then react accordingly.

Accordingly, for the purposes of the present discussion, a resiliency manager may be any code, object, or other mechanism in a computing environment that is adapted to discover one or more resources and metrics managers and to facilitate communications and/or sharing of information (e.g., status information, metrics, etc.) between one or more resources and one or more associated metrics managers.

Generally, in the specific embodiments discussed herein, the RMs automatically and dynamically discover exposed resources and exposed MMs at predetermined intervals in response to a timer thread 36 and using an MBean server with which MBeans for the resources 16, 18 and MMs 20, 22 have been registered. Note that resources registered with an MBean server may change, as new resources and MMs are added and/or other resources and MMs are removed. Such dynamically changing registrations are accommodated by the RM 14 during discovery, as the RM 14 references the associated MBean server and accompanying resource and MM registrations to obtain current registrations used to implement functionality of the system 10.

Figure 2:
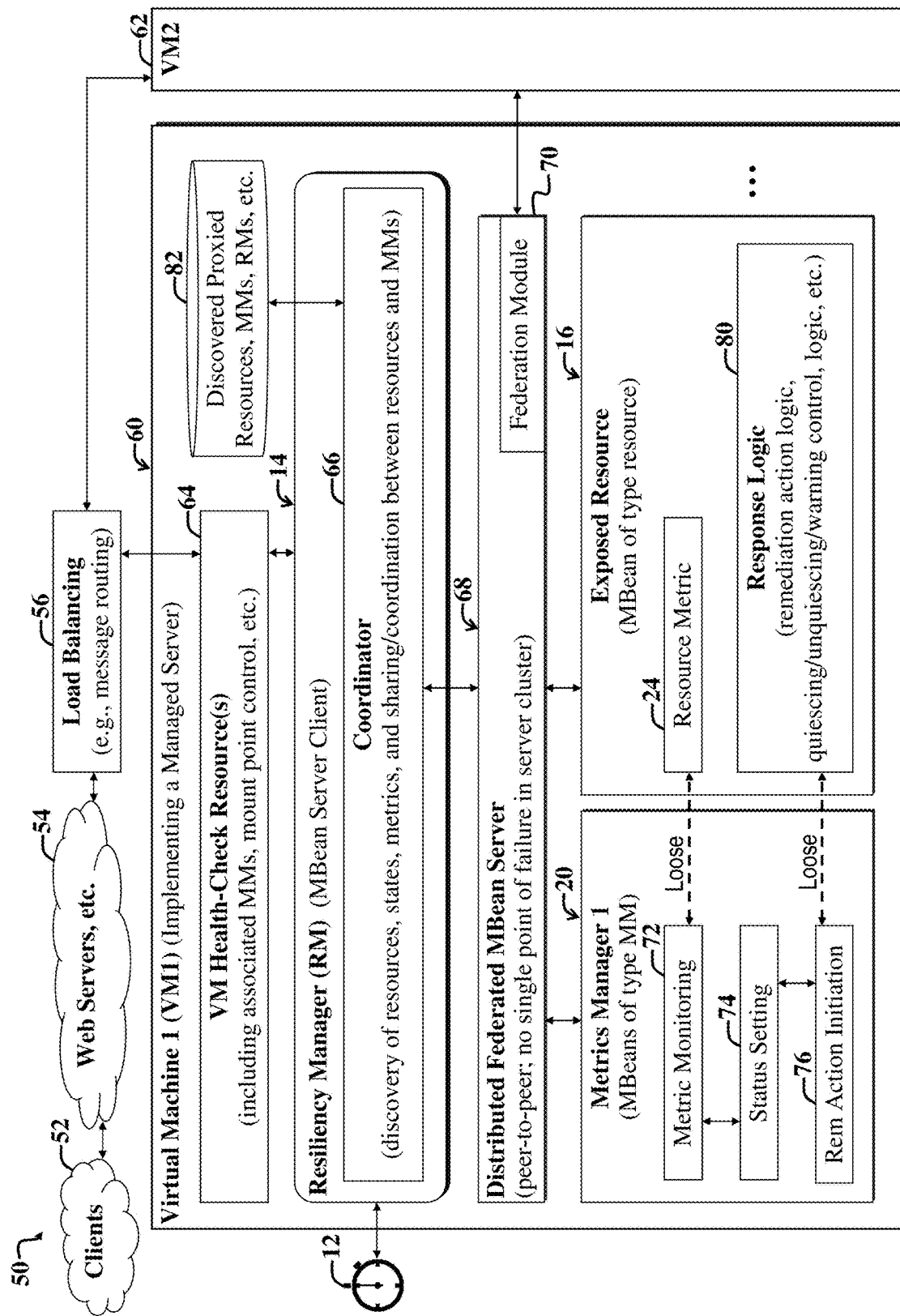
FIG. 2 is a second block diagram of an illustrative embodiment, implementing a version of the framework of FIG. 1 in a computing environment that includes a cluster of federated servers, which may share resource status information among different servers of the server cluster.

In another embodiment, discussed more fully with reference to FIG. 2, the MBean server is implemented as a distributed federated MBean server constructed in accordance with the teachings of the above-identified and incorporated co-pending U.S. Pat. No. 10,931,508, entitled SCALABLE DYNAMIC JMX FEDERATION, issued on Feb. 23, 2021.

Note that while only two MMs are shown in the system 10 of FIG. 1, that additional or fewer MMs may be implemented in a given VM, without departing from the scope of the present teachings. Similarly, each MM need not be associated with two remediation actions. A single remediation action or more than two remediation actions per MM may be implemented. Those skilled in the art with access to the present teachings will appreciate that the system 10 can dynamically grow and change, and the numbers of resources, MMs, remediation actions, and so on, may vary depending upon the needs and growth of a given computing environment.

Note that in the present example embodiment, MMs 20, 22 and associated resources 16, 18 are not tightly coupled, and instead communicate via the RM 14. This facilitates scalability and adaptability of the system 10 and associated computing environment. For example, a given MM 20, 22 may be removed, and the associated resource 16, 18 may still operate. Similarly, a given resource may be removed, and an MM that was providing status information to the resource via the RM 14 may continue to operate (or not), without prohibitively affecting the operation of the overall system 10. Furthermore, a team of developers may add a resource and one or more associated MMs and remediation actions without negatively affecting the operation of other resources, MMs, and the RM 14. Accordingly, the system 10 yields particular benefits in terms of scalability and adaptability of the overall system 10, allowing resources and MMs to be readily added, removed, and so on, as needed to meet the needs of a growing or changing computing environment. The system 10 provides additional flexibility in allowing each resource 16, 18, including any health-check resources, etc., to obtain an overall view of the health or status of the entire system 10 by accessing information maintained by or otherwise accessible via the RM 14.

Note that a given resource 16, 18 may wish to quiesce, unquiesce, or issue warning signals or messages when one or more metrics 24, 26 (that are of interest to the resource) cross a threshold or otherwise meet predetermined criteria. However, note that a given metric, which a given resource may wish to quiesce (or unquiesce or implement a warning action) in response to a metric's passing of a quiescing threshold, need not be a metric that is governed by (or determined by) that resource or even associated with that resource (e.g., by name), but it can be (e.g., in the case of a database purge in response to the entering of a warning or quiescing status).

In an example use case scenario, a team of developers develops software for a resource (e.g., the first resource 16), e.g., a database, and creates an MBean of type "resource" for the database. The MBean is then registered with an MBean server that is in communication with the RM 14. The developer team also develops one or more MMs 20, 22 for monitoring critical metrics applicable to the database 16. Alternatively, the resource 16 could be, for example, a REST endpoint used to expose services, including database-related services, provided by the system 10 to an external customer. An example metric could be database schema allocated space. In this case, the REST endpoint could quiesce in response to the database schema allocated space crossing a certain threshold. This would ensure that the service is no longer available from that server. Note that those skilled in the art with access to the present teachings may readily develop MBeans to register resources, MMs, and remediation actions, to meet the needs of a given implementation, without undue experimentation.

In the present example scenario the developers of the database decide that the database connection to the computing environment should be monitored, and then develops an MM, e.g., the first MM 20, to monitor the traffic over the connection as a function of the maximum throughput or bandwidth of the connection. The measurement of the traffic may represent a metric, e.g., the first metric 24. The developer team may also determine that when the connection reaches seventy percent (representing a threshold) of capacity that the database should enter a warning status; when it reaches ninety percent (another threshold) capacity; it should enter a quiesced status; and below seventy percent capacity (for that metric), the database can be in an unquiesced status. Logic for performing this calculation may be incorporated into the MM 20. The developer team then creates an MBean for the MM 20, which is also registered with an MBean server via which the RM 14 may dynamically discover it.

The database developer team may also wish to monitor, for example, disk space currently used by the database as compared to the maximum disk space that has been allocated for use by the database. The relative measurement may represent a second metric, e.g., the metric 26. The developers may decide, for instance, that when the used disk space reaches eighty percent of capacity (representing a threshold), then the database (and associated MM 22) shall be in a warning status; past ninety percent, a quiesced status; below eighty percent, an unquiesced status. The developer team encodes this logic in the second MM 22 and creates a simple MBean to represent the MM 22. The MBean for the MM 22 is then registered in an MBean server via which the RM 14 can discover it.

Note that the above metrics (e.g., pertaining to database throughput and disk usage) are simply examples. In practice more, fewer, and/or different metrics may be used. Generally, developer teams have the flexibility to determine which metrics are important or critical for their resource; which remediation actions should be performed in response to a resource and associated MM entering a particular status; whether to actually quiesce (or not) the resource in response to a quiesce status issued by an associated MM, and so on.

Example remediation actions 28, 30 include, for instance, running a database purge when one of the MMs 20, 22 enter a warning status. Note that the warning status of one or more of the MMs 20, 22 may be pushed to the resource 16, e.g., database. In response to a quiesce status, the remediation action(s) 28, 30 the purge remediation action may continue to run while the database is taken off line. Additional remediation actions may be initiated during the quiesced state, such as informing users that their older data may be subject to deletion, etc. Locks may be placed on database tables to further block incoming data requests, and the database may be rebuilt (as a remediation action) to facilitate freeing up disk space, etc.

After the purge and the database rebuilding, the associated MM 20 may determine, for instance, that it has been "healed," i.e., the health of the database has been restored (as it pertains to the metric 24 being monitored by the MM 20), to the extent that the space used by the database has been reduced below the quiescing and warning thresholds. The associated remediation actions 28, 30, may then complete, and the resource 16 may be pushed a notification from the MM 20 that the new status is "unquiesced."

As another example, a User Interface (UI) developer team decides to add a UI resource for generating rendering instructions for a web page. The developer team may create an MBean for the resource, the MBean of which is then registered with an MBean server that is accessible to the RM 14. The UI developer team may then choose to monitor page-access rate (e.g., page hit count per unit time) relative to a maximum page-access rate. The developers may then develop an MM 20 to monitor the page-access rate metric and to change the status of the MM 20 (and associated UI resource 16) when the page-access rate crosses certain thresholds; e.g., seventy percent of capacity for warning, eighty percent for quiescing.

When the UI resource 16 reaches, for instance, a warning status, the warning status information is pushed from the MM 20 (in response to the access-rate metric 24 passing the seventy percent of capacity threshold) to the RM 14, which may in turn push the status to the associated resource. In addition, a remediation action 28 may be triggered. The remediation action 28 may be, for instance, to issue a warning to users of the web page that is generated by the resource 16, indicating that the web page is in a warning status and may soon be unavailable. During a quiescing status, the corresponding remediation action 30 may be, for instance, to disable access to the web page and issue a "page not available" message.

Alternatively, or in addition, the UI resource 16 may be configured to react when the UI runs out of allocated disk space, or when the UI is otherwise consuming too much disk space. If the UI passes a particular disc-space usage threshold, the associated MM 20 may transition to a quiesced status, after which users of the UI resource 16 may be shown a different web page, as may be determined by developers of the UI resource 16.

Note that in the present example embodiment, the resources 16, 18 determine whether or not to quiesce in response to "quiesced" status information from the associated MM 20, 22 and also determine what is involved in quiescing (e.g., particular steps or software actions), and also selectively implements the quiescing in accordance with code included in the resources 16, 18. On the other hand, the MM 20 governs the initiation of remediation actions, e.g., running database purges, etc.

Note that in the present example embodiment, remediation actions are distinguished from actions involving quiescing and unquiescing, which are implemented by the resource 16, 18 at the discretion of the resource 16, 18. Nevertheless, certain remediation actions may involve activation or running of functionality (e.g., a database purge) available via the resource 16, 18. But not all remediation actions in all scenarios need to be implemented by the associated resource itself. Note that databases often act as internal resources, i.e., they are not necessarily exposed as MBeans, and instead one or more REST endpoints for services that use the internal database resources are exposed and readily dynamically discoverable by the RM 14. The REST endpoints then represent the exposed resources 16, 18.

As another example, the first resource 16 represents a component of the runtime that is running the VM on which the system 10 and accompanying resources run. The second resource 18 represents a health-check resource (e.g., a Load-Balancing-as-a-Service (LBaaS) health-check resource) or other local VM resiliency logic. The health-check resource 18 may monitor other resources and MMs 20, 22 in the system 10, e.g., by pulling (or receiving pushes from) metrics and status information for the resources 16, 18 and MMs 20, 22 from the RM 14.

With reference to the states of each resource 16, 18 and associated MMs 20, 22, the health-check resource 18 may determine that the overall system 10 is becoming overloaded and that the entire system 10 should quiesce, i.e., the runtime 16 should be quiesced. The health-check resource 18 and/or associated MM for the health-check resource 18 may push the quiesced status information to the runtime 16. In the meanwhile, all of the other resources and MMs in the system 10 may receive notification that the status of the runtime resource 16 is now in a quiescing or quiesced status. The remaining resources then implement code for performing additional remediation actions; for quiescing, etc.

As part of quiescing the entire VM hosting the system 10, the VM mount point may be disabled to block further communications with the VM and thereby taking the system 10 off line; separating it from any server cluster to which it belongs, such that no new request messages enter the system 10 from outside of the VM 10. The MMs 20, 22 may implement specialized quiesced-state remediation actions, so as to facilitate "healing" the VM 10 before the VM and associate system 10 is brought back online.

While the VM hosting the system 10 is quiesced, any message routing software, e.g., load balancers, may ascertain that the VM is offline and may adjust message routing and handling accordingly. Similarly, even when the VM hosting the system 10 is not offline, a load balancer and/or other message routing functionality may still ascertain the overall health of the system 10, e.g., by accessing status information (from the RM 14) pertaining to the registered health-check resource 16. As an alternative to a load balancer using a health-check resource to obtain information from the RM 14, the load balancer itself may be exposed as an external resource that is notified by the RM 14 of any MM status changes. Accordingly, the load balancer resource can selectively decide to stop or start routing messages to a given VM based on the notifications as to MM status.

In summary, the RM 14 may discover metrics and MM status information of MMs 20, 22, and then the share metrics and states or statuses among other metrics managers and resources 16, 18. The RM 14 may discover all resources 16, 18 participating in the system 10 and may pull status information from the MMs 20, 22; push status information to other MMs and to resources 14, 18. Note that runtime quiescing status information may also be pushed to MMs 20, 22; not just resources 16, 18. The MMs 28-34 may respond with certain special remediation actions to be implemented during overall quiesce of the system 10.

The RM 14 may act as a communication go-between or integrator that interfaces communications between the MMs 20, 22 (and associated registered MBeans) for a particular resource, and the MBeans for the particular resource 16, 18 that will be responding to the associated quiesced, unquiesced, or warning status information from the associated MMs 20, 22. Accordingly, the RM 14 may provide a mechanism for other resources 16, 18 (e.g., a load balancer health-check resource) that enables the associated load balancer to determine how to route messages among participating VMs and/or accompanying resources.

The MMs 20, 22 can receive feedback from the RM 14, e.g., stating that the entire runtime system is in quiescing state. The MMs 20, 22 may then determine what to do, i.e., what software actions to initiate and run. Note that generally, any communications between the MMs 20, 22 and resources 16, 18, such as the communication of state information, are done indirectly, via the RM 14, which facilitates avoiding tight coupling and enhancing scalability and resiliency of the system 10.

Alternatively, the RM 14 pushes the status information from the MMs 20, 22 to all of the resources 16, 18 that have been discovered by the RM 14. When a particular MM 20, 22 initiates a particular remediation action 28-24, other MMs in the system 10 may be notified accordingly and may react accordingly, e.g., by adjusting remediation actions, implementing additional remediation actions, and so on, in accordance with the context information received by the MMs 20, 22. Similarly, when a particular resource 16, 18 implements a quiescing operation, other resources of the system 10 and accompanying MMs 20, 22 may be notified (e.g., through the RM 14) that the particular quiescing operation is being or has been implemented.

Note that a given resource 16, 18 may be associated with or otherwise responsive to multiple MMs 20, 22. In general, resources 16, 18 in the system 10 are entities or components of the system 10 that can be quiesced, i.e., shutdown or otherwise taken offline.

In the present example embodiment, each MM 20, 22 monitors or otherwise handles only one metric, i.e., determines remediation actions to perform (or not to perform) in accordance with the value of the metric that the MM 20, 22 has been seeded with or has otherwise obtained or sensed. If any MM 20, 22 for a given resource 16, 18 enters a particular status, e.g., a "quiesced state," such status information may then be pushed to all of the MMs 20, 22 associated with that resource 16, 18. Note that in certain implementations, a given MM 20, 22 may adjust or select remediation actions not only based upon the metric 24, 26 that the MM 20, 22 monitors, but also based upon status information from other MMs in the system 10.

Note that the various remediation actions 28-34 may be performed on a resource. In such cases, the resources 16, 18 may include or implement additional remediation logic to implement remediation actions; not just quiescing, unquiescing, or warning operations.

In the present example embodiment, when the runtime of the VM that is running the system 10 is to be quiesced, the runtime quiescing status is also pushed to the MMs 20, 22; not just the resources 16, 18. The MMs 20, 22 may respond with additional special remediation actions during overall system quiesce.

In general, in the present example embodiment, the system 10 may run on a VM that is part of a larger computing environment, e.g., server cluster and/or collection of server clusters. Every VM in such a computing environment may include an instance of the system 10 in combination with a mechanism (e.g., health-check resource) to determine a status of the associated VM, thereby enabling other resources, e.g., load balancers or message routers to adjust message routing in accordance with an overall health status determinations for each VM that the load balancer or message-routing functionality fronts.

FIG. 2 is a second block diagram of an illustrative embodiment, implementing a version of the framework 10 of FIG. 1 in a computing environment that includes a cluster of federated servers 60, 62, which may share resource status information among different servers 60, 62 of the server cluster.

The example computing environment 50 includes clients 52 in communication with one or more web servers 54. A load balancer 56 selectively routes request messages from the web servers 54 to a first VM 60 and/or a second VM 62 (which implement managed application servers and form part of a cluster of servers 60, 62) in accordance with status information (also called health status herein) as obtained via a server request message servicing determination resource, i.e., health-check resource 64. The health-check resource 64 communicates with the Resiliency Manager (RM) 14 of the first VM 60 and the load balancer 56. The load balancer 56 also communicates with a similar health-check resource (not shown) of the second VM 62 of the server cluster 60, 62.

Note that while the health-check resource 64 is shown as one module, those skilled in the art will appreciate the health-check resource 64 may include, incorporate, or otherwise implement one or more associated Metrics Managers (MMs); modules for implementing associated remediation actions (e.g., for disabling or enabling VM connections or mount points to the computing environment 50), and so on. Furthermore, while no modules are shown within the second VM 62, the second VM 62 includes similar modules as the first VM 60.

The first VM 60 further includes the RM 14 in communication with a distributed federated MBean Server 68. The MBean server 68 exposes one or more resources 16 and associated one or more MMs 20 as MBeans (that have been registered with the distributed federated MBean server 68) that are discoverable by the RM 14. The RM 14 includes a coordinator module 66, which implements functionality for dynamically discovering resources, associated resource states, and metrics available from the distributed MBean server 68 via MBeans registered therewith by the MM 20 and exposed resource 16. The discovery operations implemented by the coordinator 66 of the RM 14 are initiated at predetermined times, e.g., every ten minutes, as dictated by a timer thread output from the timer 12.

Note that information about resources discovered by the RM 14 and accompanying coordinator module 66 may be stored locally as discovered resources and MMs 82. Note that while information about the discovered resources 82 is shown as being stored separately from the distributed federated MBean server 68, that in practice, the stored resource information 82 may be considered part of the distributed federated MBean server 68.

The distributed federated MBean server 68 is said to be distributed and federated, as it is peer-to-peer networked with other MBean servers of the server cluster 60, 62, via a federation module 70, also called a dynamic discovery module 70 herein. The federation module 70 includes functionality for allowing the federated MBean server 68 to discover other MBeans of other servers, e.g., of another MBean server running on the second VM 62. When the federated MBean server 68 discovers MBeans from other MBean servers, local copies of the MBeans may be stored and used locally as proxied MBeans 82.

The federation module 70 may include a replicated and synchronized tree of registered MBean Servers, associated MBeans, connectors and connector types, and so on, that enables each MBean server 68 of the federation to access and share MBeans with other MBean servers of the federation. The tree may be implemented as a Java Naming and Directory Interface (JNDI) tree or via another suitable mechanism.

A specific implementation of the distributed federated MBean server 68 uses Java Management eXtension (JMX) to provide management of distributed resources/services, e.g., by enabling resources (e.g., services) running on separate VMs to be dynamically discovered and managed from any of the participating VMs. When new VMs and/or accompanying resources or processes are added or removed from the computing environment, the associated resources are dynamically discovered (and/or removed) and available from all the other VMs as proxy MBeans under the global JMX namespace. This architecture allows management of complex heterogeneous domains to be decentralized and scalable. The construction and operation of the distributed federated MBean server 68 are discussed more fully in the above-identified and incorporated co-pending U.S. Pat. No. 10,931,508, entitled SCALABLE DYNAMIC JMX FEDERATION, issued on Feb. 23, 2021.

In the present example embodiment, the first MM 20 is shown including a metric monitoring module 72, which includes code for receiving a metric 24 pertinent to the associated exposed resource 16. Note that the metric monitoring module 72 of the MM 20 may obtain the metric 24 via the RM 14 (e.g., via pushing and/or pulling operations), as opposed to directly from the exposed resource 16. Furthermore, note that while the metric 24 is shown in FIG. 2 as being part of the exposed resource 16 that in practice, the metric 24 monitored by the MM 20 need not be part of or necessarily descriptive of the exposed resource 16. Generally, the resource 16 and metric 24 (being monitored by the MM 20) are typically (but not necessarily) separate, as discussed above (e.g., the exposed resource 16 may be a REST endpoint, and the metric 24 may for an internal resource of the server exposed via the REST endpoint, where the internal resource is not directly exposed to the RM 14 via MBean registration).

The example MM 20 further includes a status setting module 74, which includes code for comparing the metric 24 obtained by the metric monitoring module 72; comparing the metric to a threshold or other criteria, and setting a status or state for the MM 20 accordingly. The status may be, for example, quiesced, unquiesced, or warning status. The status set by the MM 20 may then be pushed to (and/or pulled by) the RM 14, and then pushed to (or pulled by) the associated exposed resource 16 via the RM 14.

The MM 20 further includes a remediation action module 76 for initiating a remediation action, e.g., by triggering remediation action logic. In the present example embodiment, the exposed resource 16 is showing including response logic 80, which includes functionality for implementing remediation actions initiated by the remediation action module 76 of the MM 20.

The exposed resource 16 is shown including response logic 80, including logic for not only implementing remediation actions, but for quiescing and/or unquiescing the exposed resource 16 in response to received resource status information (e.g., as may be received by the exposed resource from the MM 20 via the RM 14). However, those skilled in the art will appreciate that a given remediation action performed by an MM 20 need not be implemented by the associated exposed resource, i.e., some exposed resources may not directly implement certain types of remediation actions, which may be implemented via other resources or functionality of a given computing environment.

If the exposed resource 16 is a database, the remediation action implementable via the response logic 80 may include, for instance, the running of a database purge. In response to receipt of a quiesced status issued by the MM 20 and received by the exposed resource 16 via the RM 14, the response logic may implement additional functionality, e.g., for locking database tables to prevent servicing of new request messages.

The example health-check resource 64 includes code for obtaining an overall view of the health or status information for all locally registered resources 16 and MMs 20 of the first VM 60. This VM health information is then usable by the load balancer 56 to determine which VMs to direct loads (e.g., request messages) to, so as to facilitate optimizing network processing efficiency and load balancing. Accordingly, the RM 14 and associated framework can be consulted by the load balancer 56 (e.g. via the health-check resource) prior to routing requests; thereby facilitating ensuring that requests are not routed to problematic VMs and/or associated hosted thereby resources (e.g., resources that are overloaded; resources that are throwing errors, etc.).

Figure 3:
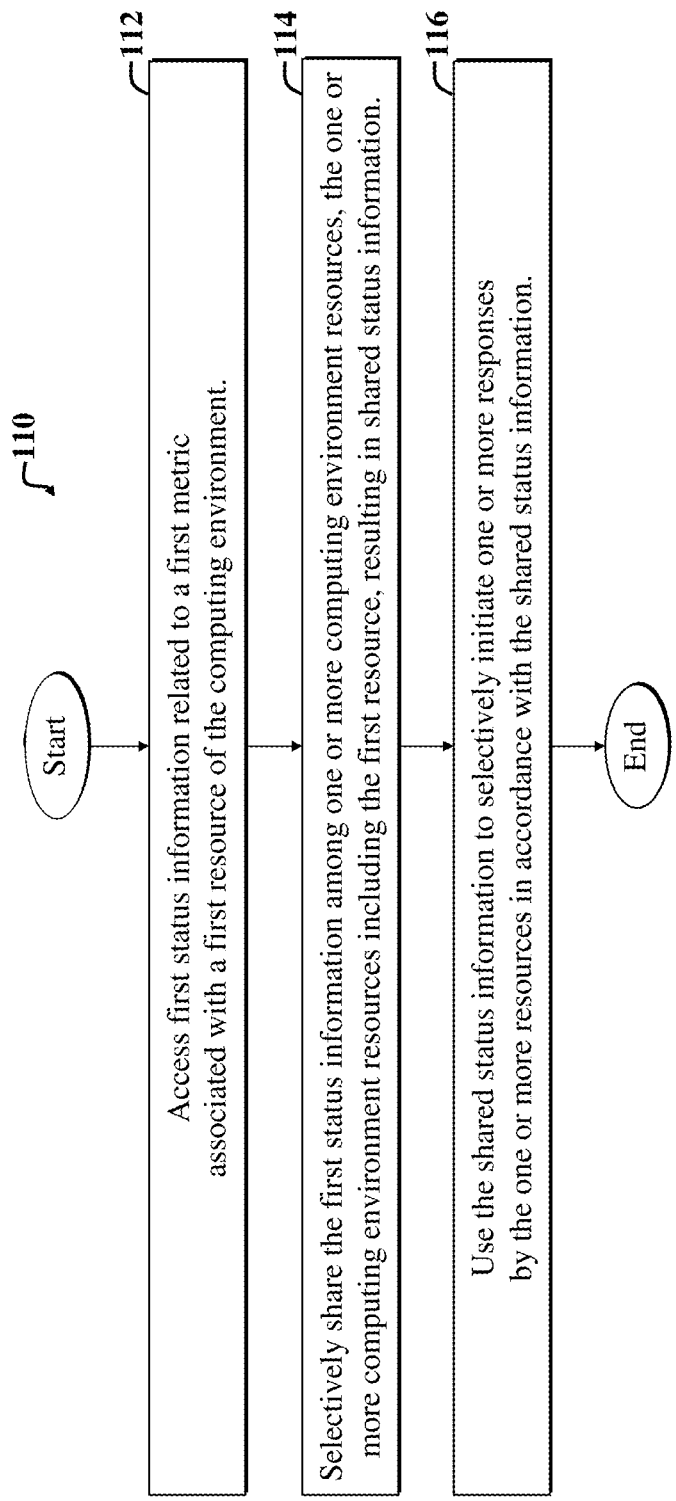
FIG. 3 is a first flow diagram of a first example method implementable via the embodiments of FIGS. 1-2.

FIG. 3 is a first flow diagram of a first example method 110 implementable via the embodiments of FIGS. 1-2. The first example method 110 facilitates enhancing resiliency in a computing environment and may be performed using a resiliency manager, e.g., the RM 14 of FIGS. 1 and 2.

An initial discovering step 112 includes accessing or obtaining first status information (e.g., indicating quiesced, unquiesced, or warning status) related to or derived based on a first metric (e.g., the metric 24 of FIGS. 1 and 2) that is associated with or otherwise affects a first resource (e.g., the resource 16 of FIGS. 1 and 2) of the computing environment.

A subsequent sharing step 114 includes selectively sharing the first status information among one or more computing environment resources (e.g., the resources 16, 18 of FIG. 1 and the associated MMs 20, 22 of FIG. 1), including the first resource, resulting in shared status information.

Next, a responding step 116 includes using the shared status information to selectively initiate one or more responses (e.g., quiescing or unquiescing of resources and/or performing one or more remediation actions 28-34 of FIG. 1) by the one or more resources in accordance with the shared status information.

Note that the first example method 110 may be modified, without departing from the scope of the present teachings. For example, the first method 110 may further specify that the one or more responses include quiescing, unquiescing, or implementing a warning activity by the one or more resources in accordance with status information indicating a quiesced status, unquiesced status, or warning status, respectively, for the one or more resources.

The example method 110 may further include using a first Metrics Manager (MM) to monitor the first metric and to compare the first metric to a predetermined threshold, yielding comparison results in response thereto; and then employing the comparison results to set or otherwise specify the first status information. The comparing of the first metric to a predetermined threshold may be implemented, for example, via the status setting module 74 of the MM 20 of FIG. 2.

The example method 110 may further include selecting and implementing a remediation action in accordance with the status information. The first resource may include, for instance, a database. The first metric may include a percentage of available data storage space for the database currently in use by the database. The comparison results may include the available data storage space exceeding a warning threshold, a quiescing threshold, etc. The first status information may include a warning status, quiesced status, etc. The remediation action includes running a database purge.

The sharing step 114 may further specify using a Resiliency Manager (RM) to obtain the first status information from the first MM; and providing the first status information to the first resource and to one or more additional resources of the computing environment. The sharing step 114 may further include providing the first status information to one or more additional MMs for one or more additional resources of the computing environment.

The responding step 116 may further specify implementing the one or more remediation actions; adjusting status information characterizing the one or more additional resources accordingly; and selectively quiescing or unquiescing of the of one or more of the one or more resources based on the adjusted status information.

Another example method includes sensing a state of one or more network resources, the state representing one or more network conditions; comparing the detected one or more network conditions to one or more condition criteria, and issuing a signal in response thereto; selecting a remediation action and/or other response (e.g., quiescing or unquiescing) in accordance with the signal; selectively implementing the remediation action and/or other response; and updating the state of the computing resource responsive to implementation of the remediation action, resulting in updated state information in response thereto.

The updated state information may be input to a load balancer, which may use the state information to facilitate routing request messages. The updated state information may indicate to the load balancer (e.g., the load balancer 56 of FIG. 2) that one or more resources on a server are in a quiesced state; and using the load balancer to choose to use a different server than the server for the purposes of sending the service request messages for servicing of the request messages.

A given resource may receive one or more network requests to be serviced by the resource. The resource may use state information to determine whether or not to process an incoming request, i.e., the status of the resource indicates whether or not the computing resource may process the request.

The load balancing functionality may include receiving a request message to be handled by a computing resource; determining computing resources in the computing environment; ascertaining a health status of each computing resource based on the sensing; selecting a computing resource to process the request message in accordance with a determination of a health status of each computing resource, resulting in a selected computing resource in response thereto; and delivering the request message to the selected computing resource.

Computing resources may be dynamically discovered at runtime computing environment implementing the first example method 110 and related variations discussed above with reference to FIG. 3. Computing resources may be added and/or removed from the computing environment, while the associated virtual machine(s) is running. To facilitate dynamic discovery, resources may be exposed to the computing environment using one or more MBeans.

Figure 4:
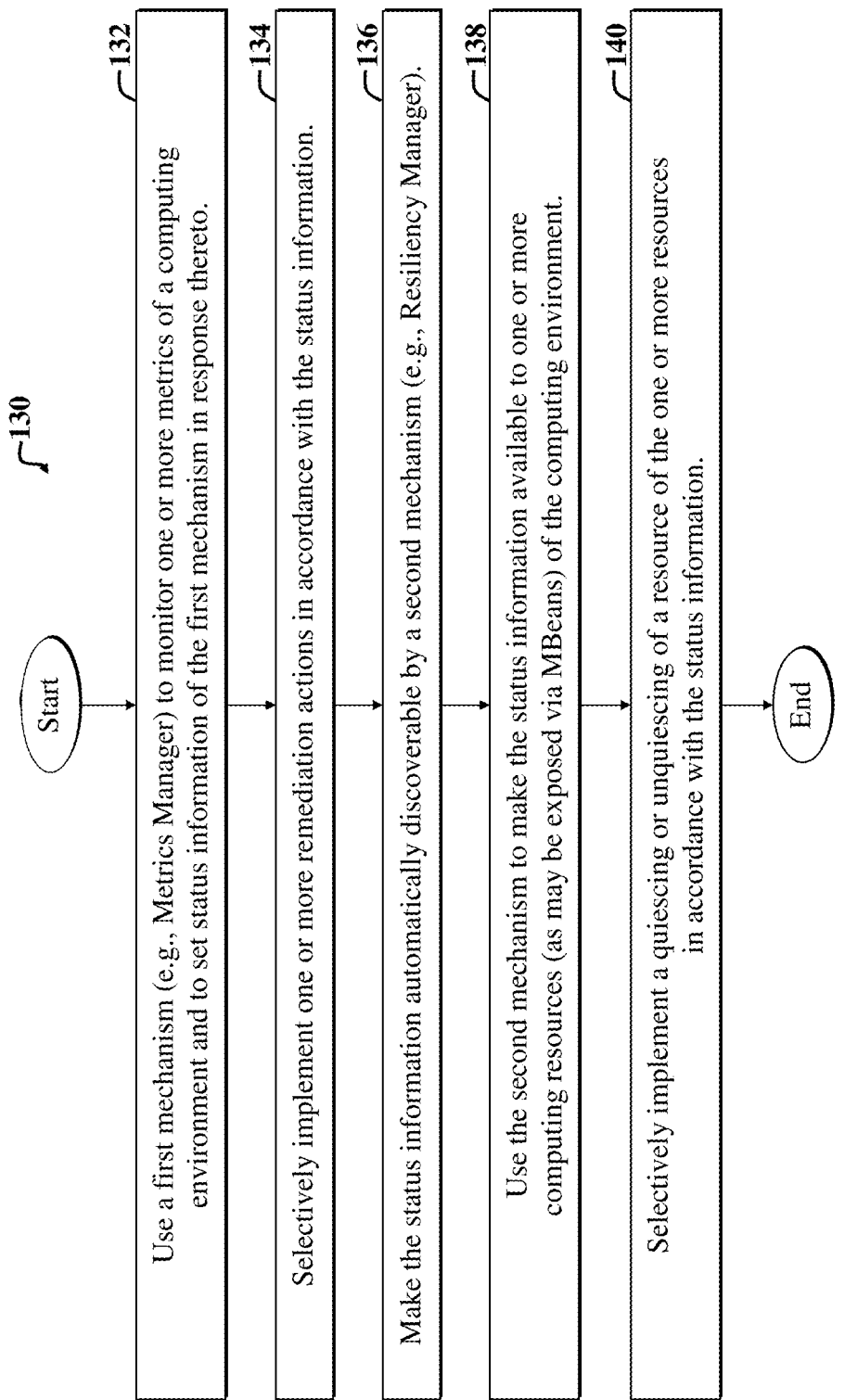
FIG. 4 is a second flow diagram of a second example method implementable via the embodiments of FIGS. 1-2.

FIG. 4 is a second flow diagram of a second example method 130 that is implementable via the embodiments of FIGS. 1-2. The second example method 130 facilitates enhancing resiliency of a computing environment.

The second example method 130 includes a first step 132, which involves using a first mechanism (e.g., one or more of the MMs 20, 22 of FIG. 1) to monitor one or more metrics (e.g., one or more of the metrics 24, 26 of FIG. 1) of a computing environment and to set status information (e.g., quiesced, unquiesced, or warning status) of the first mechanism in response thereto.

A second step 134 includes selectively implementing one or more remediation actions (e.g., the remediation actions 28-34 of FIG. 1) in accordance with the status information.

A third step 136 includes making the status information automatically discoverable by a second mechanism (e.g., the RM 14 of FIGS. 1 and 2).

A fourth step 138 includes using the second mechanism to make the status information available to one or more computing resources (e.g., one or more of the resources 16, 18 of FIG. 1) of the computing environment.

A fifth step 140 includes selectively implementing a quiescing or unquiescing of a resource of the one or more resources in accordance with the status information.

Note that the second example method 130 may be modified, without departing from the scope of the present teachings. For example, the second example method 130 may further specify that the first mechanism includes one or more Metrics Managers (MMs) associated with one or more computing resources. The one or more MMs may be implemented using one or more MBeans.

The second mechanism may include a Resiliency Manager (RM). The third step 136 may further specify registering information pertaining to the one or more MMs at an MBean server accessible to the RM; using the RM to respond to a timer thread to automatically discover the one or more MMs using the MBean server, resulting in one or more discovered MMs; and employing the RM to selectively obtain status information for each of the one or more discovered MMs.

The fourth step 138 may further specify using the RM to selectively provide the status information to the one or more resources. This may include using one or more MBeans of the one or more resources to communicate with the RM, thereby facilitating enabling the one or more resources to obtain the status information determined in accordance with the one or more applicable metrics the computing environment, wherein the one or more applicable metrics are applicable to operation of the one or more computing resources.

The status information may indicate, for instance, one or more of the following statuses for a resource of the one or more resources: a quiesced status, an unquiesced status, a warning status. The second example method 130 may further include employing the one or more MMs to cause initiation of a remediation action in response to one or more metrics monitored by the one or more MMs passing a predetermined threshold value for the one or more metrics, the predetermined threshold of which corresponds to a threshold past which status information of the one or more metrics managers changes.

The one or more metrics may include or represent one or more descriptors of a property or condition of a computing resource that is associated with an MM of the one or more MMs, and whose functioning is critical to an operation of the computing resource. The one or more metrics associated with the computing resource may be associated therewith by name, type, property, etc. Associations by name may be in accordance with a predetermined naming convention. Note that various embodiments discussed herein can be implemented by systems that are loosely coupled, e.g., to the extent that relationships between external resources and MMs need not be hard-coded. Accordingly, the accompanying overall system can grow, and more external resources and MMs can be added and can start working together to ensure the overall system resiliency.

Another example method for estimating a health status of one or more servers of a computing environment includes dynamically discovering one or more computing resources that have been registered with a server; determining one or more states of the one or more computing resources using one or more MBean interfaces to the one or more resources; using the one or more MBean interfaces to selectively implement one or more remediation actions to address one or more issues with the one or more computing resources in response to one or more metrics thereof crossing one or more predetermined metrics thresholds; reporting a new state of the one or more resources in response to completion of the one or more remediation actions; and using the new state to determine whether the server is in adequate condition to receive request messages for further processing.

Each of the one or more servers may be managed servers of a server cluster, wherein each managed server thereof includes one or more federated MBean servers. Each of the one or more federated MBean servers may implement, for instance, the following steps: receiving a request from a client device, the request querying information about computing resources connected to the network; accessing local information characterizing local computing resources responsive to the query; using a distributed synchronized log or tree describing other remote resources coupled to the network to retrieve one or more connectors for one or more remote computing resources matching the query; employing the one or more connectors to automatically connect to the one or more remote computing resources, thereby resulting in a connection; using the connection to retrieve descriptive information characterizing the one or more remote computing resources, thereby resulting in retrieved information; and maintaining the retrieved information and the local information locally for use by one or more computing resources running locally.

The server cluster may implement, for instance, the following steps: employing a first network sensor (e.g., MM) on a first server to track a first metric characterizing one or more first network resources on the first server; using a second network sensor on a second server to track a second metric characterizing one or more second network resources on the second server; registering the first network sensor with the second network sensor, and vice versa, wherein registration information includes information enabling code running on the second sensor to access information about the first metric and enabling code running on the first sensor to access information about the second metric; receiving, at the first sensor or the second sensor a request to obtain information about the second metric or the first metric, respectively; and using the registration information to fulfill the request.

Figure 5:
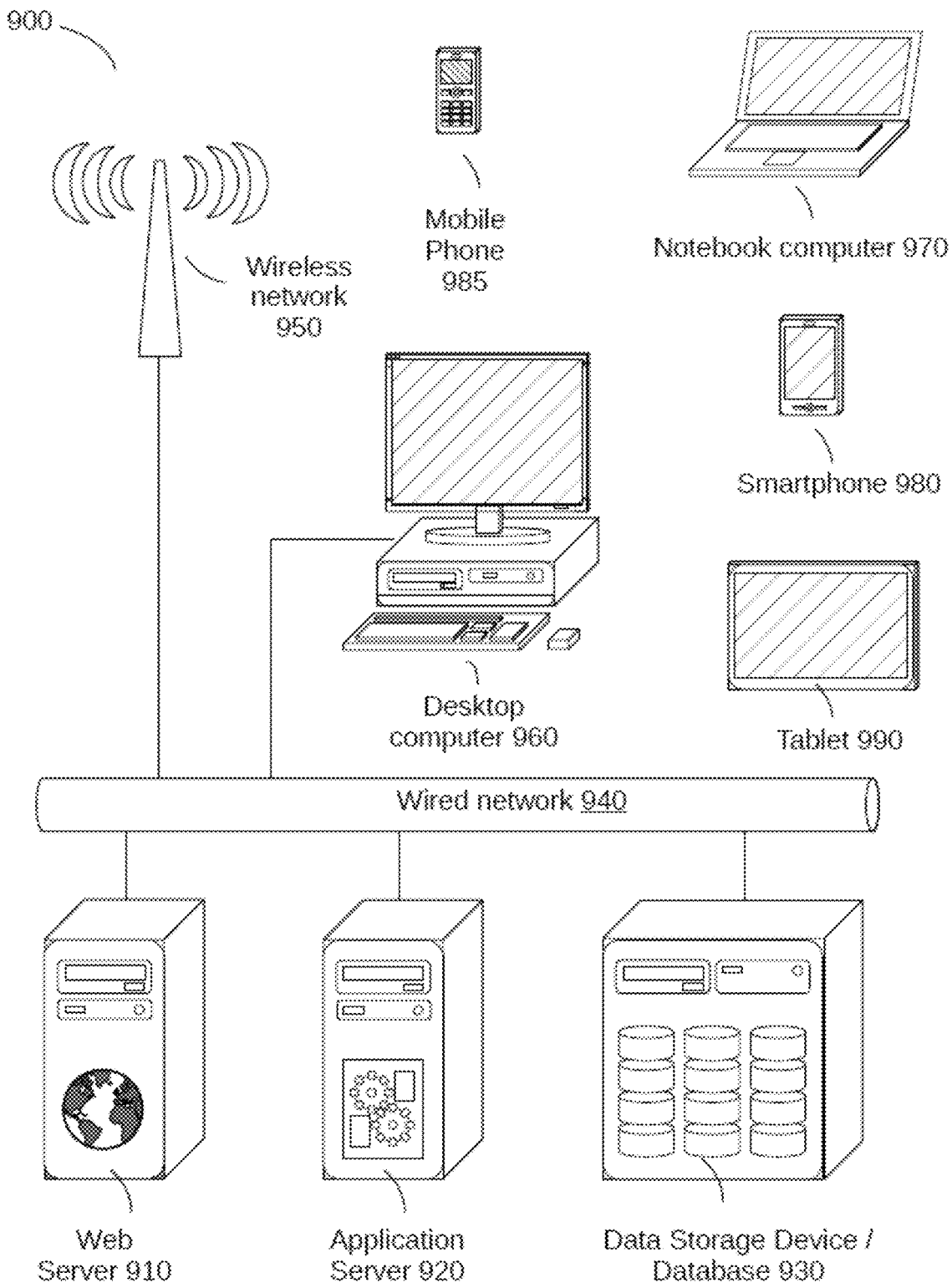
FIG. 5 is a general block diagram of a system and accompanying computing environment usable to implement the embodiments of FIGS. 1-2.

FIG. 5 is a general block diagram of a system 900 and accompanying computing environment usable to implement the embodiments of FIGS. 1-2. The example system 900 is capable of implementing the example computing environments 10 of FIG. 1 and 50 of FIG. 2 and accompanying methods 110, 130 of FIGS. 3 and 4. Embodiments may be implemented using standalone applications (for example, residing in a user device) and/or using web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language).

Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 2 and 5, the clients 52 of FIG. 2 may be implemented via one or more of the user computers 960-990 of FIG. 5. The web servers 54 of FIG. 2 may be implemented via the web server 910 of FIG. 5. The VMs 60, 62 may be run on one or more application servers, e.g., the application server 920 of FIG. 5. Discovered proxied resources 82 of FIG. 2 may be maintained in storage, e.g., the data storage device 930 of FIG. 5. Note that the data storage device 930 of FIG. 5 may also be exposed as a resource to the accompanying computing environment 900 by registering an MBean for the data storage device 930 with an MBean server (e.g., the MBean server 68 of FIG. 2) of the application server 920.

Note that in certain implementations, the one or more clients 52 of FIG. 2 may selectively access (in accordance with the their permissions) the resources, e.g., the resource 16 of FIG. 2, by first browsing to a website that provides one or more web pages with UI controls to access the resource 16. Such a web site may be hosted on the web server 910 of FIG. 5, which may communicate with the application server 920 to implement software actions in accordance with user interaction with the web page and accompanying UI controls.

Figure 6:
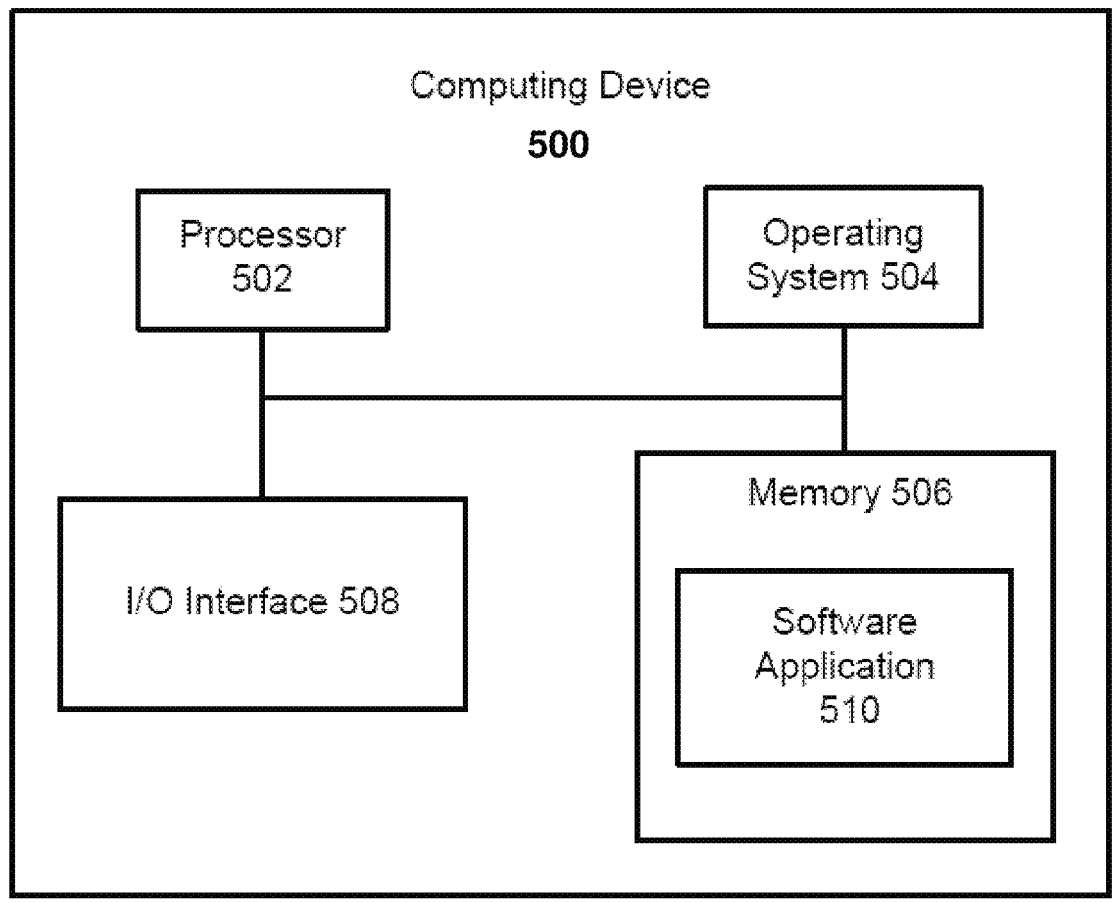
FIG. 6 is a general block diagram of a computing device usable to implement the embodiments.

FIG. 6 is a general block diagram of a computing device usable to implement the embodiments of FIGS. 1-3. While system 500 of FIG. 6 is described as facilitating performing the steps as described in certain implementations herein, any suitable component or combination of components of system 500 or any suitable processor or processors associated with system 500 may be used for performing the steps described.

FIG. 6 illustrates a block diagram of an example computing system 500, which may be used for implementations described herein. For example, computing system 500 may be used to implement server devices 910, 920 of FIG. 5 as well as to perform the method implementations described herein, e.g., to run the clients 52 of FIG. 2, wherein, for example, the software application 510 of FIG. 6 represents a browser, mobile application, or desktop client application tailored to facilitate interaction and communication with the multi-system 50 and accompanying resource 16 of FIG. 2.

In some implementations, computing system 500 may include a processor 502, an operating system 504, a memory 506, and an input/output (110) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments are discussed herein with respect to performing selective remediation actions and quiescing or unquiescing resources in accordance with sensed metrics and status information conveyed via use of MBeans and simple push/pull or other query methods, embodiments are not limited thereto. For example, embodiments may use various types of status information, which need not be limited to quiescing, unquiescing, etc., to trigger remediation actions. Furthermore, embodiments are not limited to use of MBeans. For example, another type of computing object may be employed in place of MBeans in certain implementations, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible and non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory processor-readable storage device including logic for execution by one or more processors and when executed operable for facilitating enhancing resiliency of a distributed computing environment, by performing the following operations:

using one or more first mechanisms as one or more managed beans (MBeans) associated with an MBean server, to monitor a plurality of metrics, wherein each metric of the plurality of metrics is a value of a different quality or property of a computer resource that is individually non-critical to operation of the computer resource of the computing environment;

combining at least two of the plurality of metrics as a metrics group that represents a single critical metric to the operation of the computing resource;

setting first status information based, at least in part, on the metrics group;

making, by the first mechanisms, the first status information automatically discoverable by a second mechanism accessing the MBean server;

making, by the second mechanism, the first status information available to computing resources of the computing environment, wherein the first mechanism is not directly coupled to the computing resources and the second mechanism coordinates communications between the first mechanism and the computing resources; and selectively implementing a responsive functionality, quiescing, or unquiescing of a first computing resource of the computing resources in accordance with the first status information.

2. The storage device of claim 1, wherein the first status information is for a server and the first computing resource include a REpresentational State Transfer (REST) endpoint for the server.

3. The storage device of claim 1, wherein operations further comprise:

registering the computing resources with the MBean server.

4. The storage device of claim 3, wherein operations further comprise:

discovering the computing resources by the second mechanism accessing the MBean server.

5. The storage device of claim 1, wherein the first status information includes one of a quiesce status, a unquiesce, or a warning status.

6. The storage device of claim 1, wherein the MBean server is a first MBean server peer-to-peer networked with a second MBean server to discover other MBeans of the second MBean server.

7. The storage device of claim 1, wherein the first status information includes a value meeting a critical threshold, and wherein the operations further comprise:

setting second status information based, at least in part, on the metrics group failing below the critical threshold; and restoring the responsive functionality, quiescing, or unquiescing of the first computing resource in accordance with the second status information.

8. A method for enhancing resiliency of a distributed computing environment, the method comprising:

using one or more first mechanisms as one or more managed beans (MBeans) associated with an MBean server, to monitor a plurality of metrics, wherein each metric of the plurality of metrics is a value of a different quality or property of a computer resource that is individually non-critical to operation of the computer resource of the computing environment;

combining at least two of the plurality of metrics as a metrics group that represents a single critical metric to the operation of the computing resource;

setting status information based, at least in part, on the metrics group;

making, by the first mechanisms, the status information automatically discoverable by a second mechanism accessing the MBean server;

making, by the second mechanism, the status information available to computing resources of the computing environment, wherein the first mechanism is not directly coupled to the computing resources and the second mechanism coordinates communications between the first mechanism and the computing resources; and selectively implementing a responsive functionality, quiescing, or unquiescing of a first computing resource of the computing resources in accordance with the status information.

9. The method of claim 8, wherein the status information is for a server and the first computing resource include a REpresentational State Transfer (REST) endpoint for the server.

10. The method of claim 8, further comprising:

registering the computing resources with the MBean server.

11. The method of claim 10, further comprising:

discovering the computing resources by the second mechanism accessing the MBean server.

12. The method of claim 8, wherein the status information includes one of one of a quiesce status, a unquiesce, or a warning status.

13. The method of claim 8, wherein the MBean server is a first MBean server peer-to-peer networked with a second MBean server to discover other MBeans of the second MBean server.

14. An apparatus for enhancing resiliency of a distributed computing environment, the apparatus comprising:

one or more processors;

logic encoded in one or more non-transitory media for execution by the one or more processors and when executed operable for:

using one or more first mechanisms as one or more managed beans (MBeans) associated with an MBean server, to monitor a plurality of metrics, wherein each metric of the plurality of metrics is a value of a different quality or property of a computer resource that is individually non-critical to operation of the computer resource of the computing environment;

combining at least two of the plurality of metrics as a metrics group that represents a single critical metric to the operation of the computing resource;

setting first status information based, at least in part, on the metrics group;

making, by the first mechanisms, the status information automatically discoverable by a second mechanism accessing the MBean server;

making, by the second mechanism, the status information available to computing resources of the computing environment, wherein the first mechanism is not directly coupled to the computing resources and the second mechanism coordinates communications between the first mechanism and the computing resources; and selectively implementing a responsive functionality, quiescing, or unquiescing of a first computing resource of the computing resources in accordance with the status information.

15. The apparatus of claim 14, wherein the status information is for a server and the first computing resource include a REpresentational State Transfer (REST) endpoint for the server.

16. The apparatus of claim 14, wherein the logic is further operable for:
   registering the computing resources with the MBean server.

17. The apparatus of claim 16, wherein the logic is further operable for:
   discovering the computing resources by the second mechanism accessing the MBean server.

18. The apparatus of claim 14, wherein the MBean server is a first MBean server peer-to-peer networked with a second MBean server to discover other MBeans of the second MBean server.

\* \* \* \* \*